June 13, 1961     G. F. SCHROEDER     2,988,737
ANALOG-TO-DIGITAL CONVERTER
Filed Dec. 30, 1958
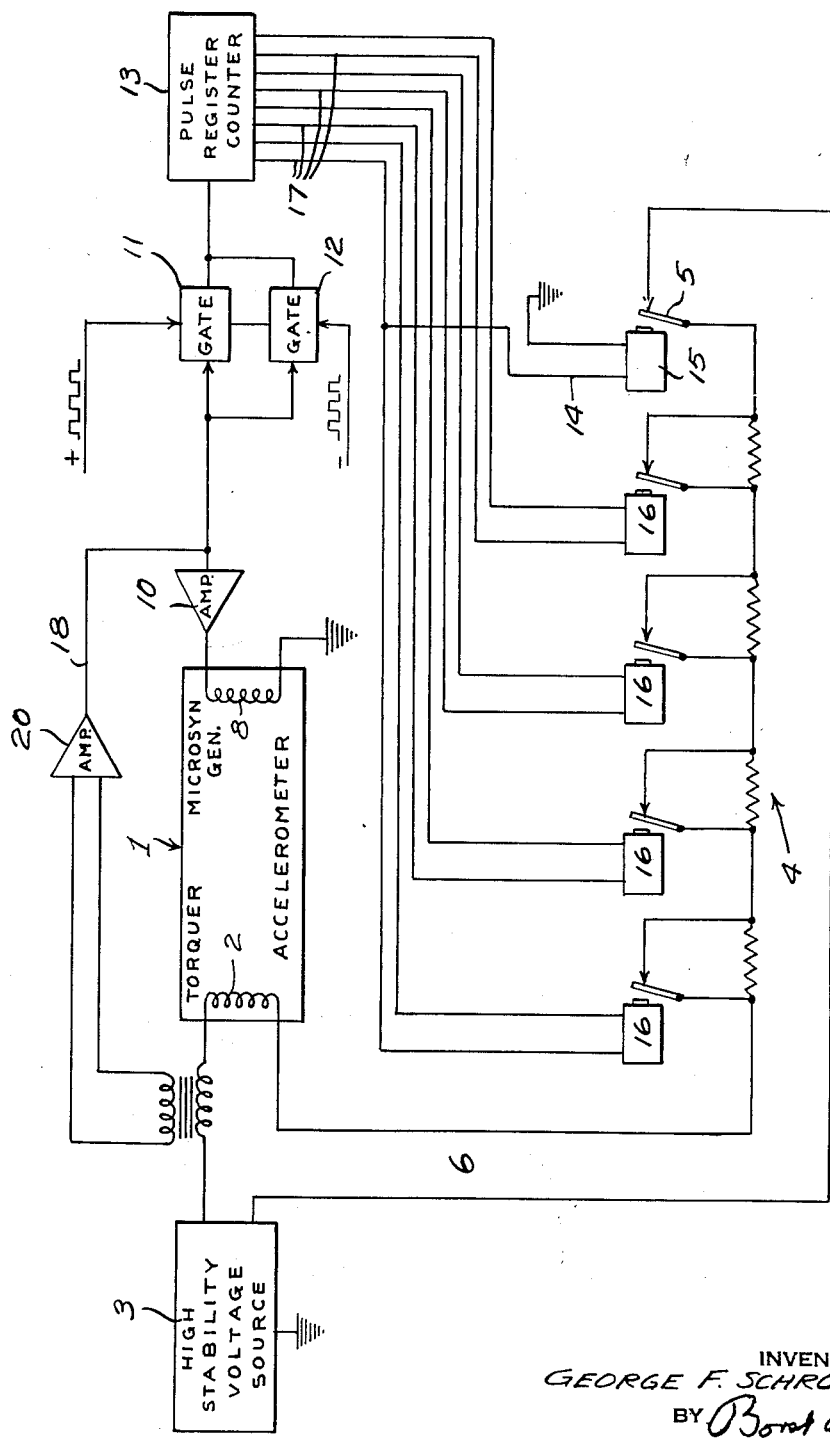
INVENTOR
GEORGE F. SCHROEDER
BY *Borst & Borst*
ATTORNEYS United States Patent Office 2,988,737
Patented June 13, 1961

2,988,737
ANALOG-TO-DIGITAL CONVERTER
George F. Schroeder, Pines Lake, N.J., assignor to Sperry Rand Corporation, Ford Instrument Company Division, Wilmington, Del., a corporation of Delaware
Filed Dec. 30, 1958, Ser. No. 783,855
4 Claims. (Cl. 340—347)

This invention relates to analog-to-digital converters and especially to converters of this type which employ analog devices which are adapted to yield an electrical output responsive to some mechanical force applied thereto for the purpose of its measurement.

Because of the extreme sensitivity of many mechanical sensing devices presently in use, a problem of accuracy is encountered in efforts to convert the analog outputs of such devices to a digital form. Present day accelerometers, for example, have acceleration sensing capabilities in the order of one part per hundred thousand, and hence the degree of precision required in the sensing element used to determine the error existing in the conversion may be appreciated. In this respect, one expedient that is used is to set up a resistor matrix operating from a precision reference voltage in such a way that the closure of switches by a digital code will insert resistance into a circuit so as to produce an accurate D.C. current. This current would be compared to the torquer current and a supersensitive D.C. detector would be required to determine the error between these devices and control the digital code to effect a null. It is evident that in such an arrangement the D.C. sensor device would be one of the limiting factors in the overall system.

According to this invention, it is proposed to eliminate the sensing element for comparing the output of the analog and digital devices in order to effect the desired nulling of the latter, and in lieu thereof, provide a special input circuit for the mechanical sensing or analog device which is controlled by the digital output. Accordingly, the analog device may be directly controlled for nulling purposes by the output of the converter so as to dispense with additional error sensing components. To this end, there is provided an accelerometer as the mechanical sensor and this analog device is referenced by a precise D.C. reference voltage through a resistor bank controlled through relays by the digital counter connected to receive the electrical output of the accelerometer. The resistor bank and reference voltage source thus constitute a special input circuit for the accelerometer and it is evident that the current flowing therein will bear a precise relationship to the digital output of the counter. When the output of the accelerometer has been nulled by the control current in its input circuit, the accuracy of the digital output is assured. These and other features of the invention may be more fully understood on reading the following detailed description of one embodiment thereof, the description being taken in conjunction with the accompanying drawing showing an analog-to-digital converter arranged according to the invention.

Referring to the drawings, an accelerometer 1 is employed as the analog device in the converter. The accelerometer is of standard design having a torquer including a pendulous element designed to develop a torque output governed by the acceleration forces applied thereto and arranged on movement to coact with the field presented by the winding 2. The positive terminal of a highly stable voltage source 3 is connected to one side of the winding 2 the other side of which is connected to a bank of series resistors 4 which are adapted to be connected through the switch 5 and the negative terminal of the source to ground so as to complete the special input circuit 6 for the accelerometer.

As in conventional instruments of this type the accelerometer torquer movement is detected by a sensitive "microsyn" synchro receiver or generator whose electrical output on the winding 8 is amplified in the servo amplifier 10 and applied to the positive pulse gate 11 and the negative pulse gate 12 which is disposed in parallel therewith. The additive or subtractive error pulses, whichever are passed in accordance with their polarity by the gates 11 and 12, are introduced to the pulse register 13 which is a standard digital code counter adapted to yield voltages depending on the number of input pulses stored and counted therein.

The pulse register 13 has an output circuit 14 across which is connected the relay coil 15 in control of the make and break switch 5 in the input circuit 6. A bank of resistor shunting relays 16 is placed in control of the several resistors in the resistor bank, the relays being independently controlled by separate output circuit 17. The resistors are weighted to conform to the particular digital code being used and their corresponding relays are operated so that the resistors may be selectively shunted out of the input circuit 6 in accordance with the voltage output of the digital pulse register.

In operation, it may be seen that as an acceleration is applied to the accelerometer pendulum, the pendulum will move, and this movement would be detected by the microsyn. A positive error in the microsyn would produce a positive train of pulses via the control gates. These pulses would be summed in the digital register. The presence of voltages within the register would cause relays to be closed in the resistor bank, thereby applying an error nulling control current to the accelerometer torquer. The torquer will build up current and field to such a value as to completely nullify its acceleration forces, thus returning the microsyn generally to a null condition. It is thus apparent that the accelerometer itself has been utilized as the sensing device for establishment of the required digital code. No other sensing devices need be employed. The accuracy of this system should be equal to that of the analog device itself, there being no other sensing devices to introduce additional errors. It should be noted that this type of servo system, resulting in the application of a pulse train to the nulling control loop which includes the accelerometer, in effect will give integral control to the servo loop which includes the accelerometer.

Inasmuch as it has been found desirable to use relays to control the resistor bank as explained above, the time of closure of the relays could be a problem when considering the frequency response requirements of the accelerometer. Specifically, it is preferred to keep the accelerometer in a null condition to prevent cross coupling effects due to the accelerometers being at 90° to the normal input axis. It may therefore be desirable to take part of the error signal and amplify it in an analog fashion and couple it in an A.C. manner into the torquer circuit. To this end a high frequency information circuit 18 is connected to the output side of the accelerometer and is coupled through amplifier 20 to the input side of the accelerometer. This circuit may be looked upon as a high pass filter producing torques necessary to keep the accelerometer in balance at a high frequency within the frequency spectrum which may be present under vibration conditions. The analog-to-digital portions of the system would be the low pass part of the control. This will have the following end result: The digital code will contain the D.C. or low frequency portion of the acceleration measurement which is required to be passed on to the rest of the computing system. The high frequency or A.C. portion of the control loop might be employed for stabilization reasons and to prevent high frequency vibrations from appearing in the accelerometer.

It should be understood that the general concept of invention is applicable to analog-to-digital converters generally, provided there are employed sensors which operate on the balance principle and which are adapted to produce error signals at one point and to be controlled at another point. It is also adaptable to a plus or minus torque by substituting a plus or minus reference voltage source to the system. In other words, it may be said that specific modifications may be effected in the system as above described without necessarily departing from the scope of invention as defined in the appended claims.

What is claimed is:

1. An analog-to-digital converter comprising an accelerometer device having a field winding and a torquer having a pendulous element adapted on movement to coact with said winding, said accelerometer device being adapted to yield an electrical output proportional to an analog signal voltage applied thereto, a digital register, an output circuit through which the electrical output of said accelerometer is imparted to said digital register, a stable reference voltage source, an input circuit for said accelerometer which includes said field winding and said voltage source, a plurality of resistors disposed in series and adapted to be selectively cut into and out of said input circuit, a plurality of shunting relays one of which is operatively associated with each of said resistors, each of said relays being interposed in a separate circuit which includes said digital register and operative when energized by a voltage imparted thereto by said digital register to cut the associated resistor into said input circuit, whereby said input circuit in response to said digital register is adapted to null said analog-to-digital converter.

2. An analog-to-digital converter as defined by claim 1 in which a servo amplifier is interposed in said output circuit between said accelerometer and said digital register.

3. An analog-to-digital converter as defined in claim 2 in which a positive pulse gate and a negative pulse gate are interposed in parallel in said output circuit between said servo amplifier and said digital register.

4. An analog-to-digital converter as defined by claim 3 in which a high frequency information circuit is connected to said output circuit between said servo amplifier and said gates and is coupled to said input circuit between said voltage source and said field winding to thereby prevent high frequency vibrations from appearing in said accelerometer.

References Cited in the file of this patent

UNITED STATES PATENTS

| | | |
|---|---|---|
| 2,834,011 | Mork | May 6, 1958 |
| 2,839,740 | Haanstra | June 17, 1958 |
| 2,839,744 | Slocomb | June 17, 1958 |
| 2,872,670 | Dickinson | Feb. 3, 1959 |